United States Patent [19]

Malon et al.

[11] Patent Number: 4,486,202
[45] Date of Patent: Dec. 4, 1984

[54] ASYMMETRIC GAS SEPARATION MEMBRANES

[75] Inventors: Raymond F. Malon, Edmundson; Anthony Zampini, St. Louis, both of Mo.

[73] Assignee: Monsanto Company, St. Louis, Mo.

[21] Appl. No.: 509,613

[22] Filed: Jun. 30, 1983

[51] Int. Cl.$^3$ .............................................. B01D 53/22
[52] U.S. Cl. ..................................................... 55/158
[58] Field of Search ................... 55/16, 158; 210/500.2

[56] References Cited

U.S. PATENT DOCUMENTS

| | | | |
|---|---|---|---|
| 3,616,607 | 11/1971 | Klass et al. | 55/16 |
| 3,657,113 | 4/1972 | Stancell et al. | 55/16 X |
| 3,745,202 | 7/1973 | Riggleman et al. | 210/500.2 X |
| 3,775,308 | 11/1973 | Yasuda | 210/500.2 X |
| 3,954,925 | 5/1976 | Boddeker | 210/500.2 X |
| 3,980,456 | 9/1976 | Browall | 55/158 |
| 4,199,445 | 4/1980 | Chiang et al. | 210/500.2 X |
| 4,230,463 | 10/1980 | Henis et al. | 55/16 |
| 4,340,480 | 7/1982 | Pall et al. | 210/500.2 X |
| 4,364,759 | 12/1982 | Brooks et al. | 55/16 X |
| 4,371,487 | 2/1983 | Hamada et al. | 210/500.2 X |

OTHER PUBLICATIONS

Hwang, et al., Techniques of Chemistry, vol. VII, Membranes in Separations, Chapter 12, John Wiley & Sons, 1975.
PB 81-147787 (NTIS) Final Report submitted to OWS&T, U.S. Department of Interior (Cabasso).
PB 82-103920 (NTIS) Final Report submitted to OWS&T, U.S. Department of Interior (Cabasso).
ACS Div. of Org. Coatings and Plasticizer Chem. Papers, Cabasso, vol. 35(1), pp. 492-497 (1975).

*Primary Examiner*—Robert Spitzer
*Attorney, Agent, or Firm*—Henry Croskell

[57] ABSTRACT

Asymmetric gas separation membranes of materials having selective permeation of at least one gas of a gaseous mixture over that of one or more remaining gases of the gaseous mixture, exhibit significantly improved permeation selectivities for the at least one gas when the asymmetric membrane is contacted on one or both surfaces with an effective amount of a Lewis acid. The improved asymmetric gas separation membranes, process for producing the improved membrane, and processes utilizing such membranes for selectively separating at least one gas from a gaseous mixture by permeation are disclosed.

6 Claims, No Drawings

ASYMMETRIC GAS SEPARATION MEMBRANES

BACKGROUND OF THE INVENTION

This invention relates to an asymmetric gas separation membrane which exhibits improved gas separation selectivity and the process to produce such an improved asymmetric gas separation membrane. In another aspect, the invention relates to processes utilizing such membranes for improved selectivity in the separation of at least one gas from a gaseous mixture by permeation.

The separating, including upgrading of the concentration of at least one selective gas from a gaseous mixture, is an especially important procedure in view of the demands and the supplies of chemical feedstocks. Frequently these demands are met by separating one or more desired gases from gaseous mixtures and utilizing the gaseous products for processing. Applications have been made employing separation membranes for selectively separating one or more gases from gaseous mixtures. To achieve selective separation, the membrane exhibits less resistance to transport of one or more gases than of at least one other gas of the mixture. Thus, selective separation can provide preferential depletion or concentration of one or more desired gases in the mixture with respect to at least one other gas and therefore provide a product having a different proportion of the one or more desired gases to the at least one other gas than the proportion in the mixture. However, in order for selective separation of the one or more desired gases by the use of separation membranes to be technically feasible the membranes must satisfy several criteria so that the use of the separation procedure has utility. For instance, the membranes must be capable of withstanding the conditions to which they may be subjected during the separation operation. The membranes must also provide an adequately selective separation of one or more desired gases at a sufficiently high flux, that is, permeation rate of the permeate gas per unit surface area. Thus, separation membranes which exhibit a high flux but low selectivity separation are unattractive as they require large separating membrane surface area. Similarly, separation membranes which exhibit adequate selectivity but undesirable low fluxes are also unattractive as they require large separating membrane surface area. Furthermore, membranes which are not capable of maintaining the desired performance of flux and selectivity over an extended period of time in adverse operating environments are likewise undesirable. Adverse environmental conditions include extremes of temperature, pressure and concentration of chemical contaminants. Accordingly, research has continued to develop gas separation membranes which provide improved performance regarding the separation of one or more desired gases for an extended period of time under adverse environmental conditions.

The passage of gas through a membrane can proceed through pores, i.e. continuous channels for fluid flow and communication with both feed and exit surfaces of the membrane (which pores may or may not be suitable for separation by Knudsen flow or diffusion); in another mechanism, in accordance with current views of gas separation membrane theory the passage of a gas through the membrane may be by interaction of a gas with a material of the membrane. In this latter postulated mechanism, the permeability of a gas through a membrane is believed to involve the solubility of the gas in the membrane material and the diffusion of the gas through the membrane. The permeability constant for single gas is presently viewed as being the product of the solubility and diffusiveness of the gas in the membrane. A given membrane material has a particular permeability constant for passage of the given gas by the interaction of the gas with the material of the membrane. The rate of permeation of the gas, i.e. flux through the membrane is related to the permeability constant, but is also influenced by variables such as the membrane thickness, the physical nature of the membrane, the partial pressure differential of the permeate gas across the membrane, the temperature and the like.

In general, efforts have been directed at providing material of a gas separation membrane in as thin a form as possible in view of the low permeabilities of most membrane materials in order to provide adequate flux while providing a membrane as porefree as possible such that gases are passed through the membrane by interaction with the material of the membrane. One approach for developing separation membranes suitable for gaseous systems has been to provide composite membranes having the thinnest possible superimposed membranes supported on an anisotropic porous support where the superimposed ultrathin membrane provides the desired separation. The superimposed membranes are advantageously sufficiently thin, i.e. ultrathin, to provide reasonable fluxes. The essential function of a porous support is to support the superimposed membrane. Suitable supports are desirably porous to provide low resistance to permeate passage after the superimposed membrane has performed its function of selectivity separating the permeate from the feed mixture. Klass et al, U.S. Pat. No. 3,616,607; Stancell et al, U.S. Pat. No. 3,657,113; Wasuda, U.S. Pat. No. 3,775,303; and Browall, U.S. Pat. No. 3,980,456 exemplify gas separation membranes having superimposed thin membranes on a porous support.

Such composite membranes for gas separations have not been without problems. For instance, Browall discloses that in the fabrication of composite membranes of ultrathin films, fine particles, particles below about 3,000 angstroms in size, may be deposited under or between preformed ultrathin membrane layers and because of their large size in comparison to the ultrathin membranes, puncture the ultrathin membranes. Such breaches reduce the selectivity and thus the effectiveness of the membrane. The Browall patent discloses applying a preformed organopolysiloxane-polycarbonate copolymer sealing material over the ultrathin membrane to cover the breaches caused by the fine particles. Browall also discloses employing a preformed layer of the organopolysiloxane-polycarbonate copolymer between the ultrathin membranes and the porous polycarbonate support as an adhesive. Thus, the composite membranes of Browall are complex in materials and techniques of construction.

A major improvement in gas separation membranes is disclosed by Henis et al in U.S Pat. No. 4,230,463 which pertains to particular multicomponent membranes for gas separations comprising a coating in contact with the porous separation membrane wherein the separation properties of the multicomponent membranes are principally determined by the porous separation membrane as opposed to the material of the coating. Such multicomponent membranes for the separation of at least one gas from a gaseous mixture can exhibit a desirable selectivity and still exhibit a useful flux. Moreover, such multicomponent membranes for gas separation can be fabricated from a wide variety of gas separation membrane materials which are advantageous for a given gas separation. The desired combination of flux and selectivity of separation can be provided by the configuration and methods of preparation and combinations of the components. For instance, material having high selectivity of separation but a relatively low permeability constant can be utilized to provide multicomponent membranes having desired permeation rates and desired selectivity of separation through utilization of a porous substrate which contributes to the overall separation efficiency of the multicomponent membrane.

Despite such advances in gas membrane separations, it would be advantageous to construct any membrane, including such multicomponent membranes, from materials that have reasonably good flux and substantially improved selectivity of separation while still remaining stable in use. That is, the membrane should have high structural strength, toughness, abrasion and chemical resistance to remain functional under extremes of temperature and differential pressure. In this regard such membranes are often required to operate at pressure differentials across the membrane of at least 2100 or 3500 KPa or higher, for instance up to 13800 KPa or ever higher. In general, operation environments require membrane material which is resistant to hydrocarbons, ammmonia, water, and acid gases such as carbon dioxide and hydrogen sulfide and the like. Such chemicals may have a tendency to dissolve or plasticize the material of the gas separation membranes resulting in deterioration of the membrane or densification of an otherwise asymmetric structure.

Research efforts continue in the field of gas separation membrane technology to reach economic gas separation performance utilizing asymmetric membranes of materials which have intrinsically high separation selectivity for gases such as hydrogen, carbon dioxide and the like. Attempts to eliminate surface porosity of these membrane materials in an asymmetric state by using either spinning or post treatment techniques have generally resulted in membranes, particularly hollow fiber membranes, that have poor performance gas separations either in low flux or low selectivities or both. With hollow fiber gas separation membranes spun from polymeric materials having high intrinsic selectivities for gas separations such as polyphenylene oxides, substituted polyphenylene oxides, polyimides, polyamides, polysulfones, polyethersulfones, cellulose esters, and the like, these treatments have produced modified fibers with uncoated separation properties of interest compared to those of multicomponent coated polysulfone fibers. We have found that treatment of flat or porous hollow fiber asymmetric gas separation membranes with Lewis acids offers a productive and simple route to uncoated gas separation membranes having desirable separation properties of commercial utility levels.

DEFINITION OF TERMS

Separation factor ($\alpha a/b$) for a membrane for a given pair of gases a and b is defined as the ratio of the permeability constant ($P_a$) of the membrane for gas a to the permeability constant ($P_b$) of the membrane for gas b. Separation factor is also equal to the ratio of the permeability ($P_a/l$) of a membrane of thickness l for gas a of a gas mixture to the permeability of the same membrane to gas b, $P_b/l$) wherein the permeability for a given gas is the volume of gas, standard temperature and pressure (STP), which passes through a membrane per square centimeter of surface area, per second, for a partial pressure drop of one centimeter of mercury across the membrane per unit of thickness, and is expressed as P/l $=cm^3/cm^2$-sec-cmHg.

In practice, the separation factor with respect to a given pair of gases for a given membrane can be determined employing numerous techniques which provide sufficient information for calculation of permeability constants or permeabilities for each of the pair of gases. Several of the many techniques available for determining permeability constants, permeabilities, and separation factors are disclosed by Hwang et al, Techniques of Chemistry, Volume VII, Membranes in Separations, John Wiley & Sons, 1975 (herein incorporated by reference) at Chapter 12, pages 296 to 322.

An intrinsic separation factor as referred to herein is the separation factor for a material which has no channels for gas flow across the material and is the highest achievable separation factor for the material. Such a material may be referred to as being continuous or nonporous. The intrinsic separation factor of a material can be approximated by measuring the separation factor of a compact membrane of the material. However, several difficulties may exist in the determination of an intrinsic separation factor including imperfections introduced in the preparation of the compact membrane such as the presence of pores, the presence of fine particles in the compact membrane, undefined molecular order due to variations in membrane preparation, and the like. Consequently, the determined intrinsic separation factor can be lower than the intrinsic separation factor. Accordingly, a "determined intrinsic separation factor" as employed herein refers to the separation factor of a dry compact membrane of the material.

Dense or compact membranes are membranes which are essentially free of pores, i.e. fluid flow channels communicating between the surfaces of the membrane and are essentially free of voids, i.e. regions within the thickness of the membrane which do not contain the material of the membrane. The dense membrane is essentially the same throughout the structure, therefore it falls within the definition of isotropic membrane. On the other hand, porous separation membranes relate to membranes having continuous channels for fluid flow which communicate between the feed surface and the exit surface. Porous regions of such membranes can also extend from the surface skin or compact surface through approximately 90 to 99% of the total membrane thickness. The remaining dense region extends to the opposite surface. Asymmetric membranes have considerable internal void volume; however, this volume is not related to continuous porosity from one side of the membrane to the other. Asymmetric membranes have at least one skinned surface, i.e. a compact layer that is at an internal or external surface which is generally on one or both faces of the membrane.

For many purposes it is sufficient to say that an acid is a hydrogen containing substance which disassociates on solution in water to produce one or more hydrogen ions. More generally, however, acids are defined according to other concepts. The Bronsted-Lowry acid concept states that an acid is any compound which can furnish a proton. Non-protonic substances often possess properties such as the ability to displace a weaker acid from its compound. Lewis acids in general are defined as those acids which function as electron-pair acceptors. It is often stated that Lewis acids are a wider and more general class of substance that include Bronsted-Lowry acids as a special case. A distinction between Bronsted-Lowry and Lewis acids is that acid-base reactions in the Bronsted-Lowry sense are proton-transfer reactions since they involve only the transfer of a nucleus without the attendant electrons.

Lewis acid-base reactions involve electron pairs, i.e. a Lewis base as anything that has available an unshared pair of electrons, such as $NH_3$, :N, and a Lewis acid as anything that might attached itself to such a pair of electrons, such as H+, or $BF_3$ to form $F_3B-NH_3$.

For purposes of describing this invention, the acids used are preferably Lewis acids; however, these acids can be in vapor or solution form. Preferably the acids used are volatile at ambient conditions.

An "effective amount" of acid as referred to herein is used in relation to the amount of acid contacted with the asymmetric gas separation membrane. This effective amount can be varied by factors such as acid concentration, time of exposure, temperature and the like. An effective amount is herein defined as that acid contact amount sufficient to improve the asymmetric gas separation membrane selectivity but insufficient to significantly impair the mechanical integrity, strength, or other physical properties of the polymer which are detrimental to the function of the polymeric membrane as a gas separator.

SUMMARY OF THE INVENTION

The invention provides gas separation membranes comprised of asymmetric membranes exhibiting substantially improved gas separation selectivity. A preformed asymmetric gas separation membrane of material having selective permeation of at least one gas of a gaseous mixture over that of one or more remaining gases of the gaseous mixture has been found to exhibit improved separation factors for the permeating gases after being contacted on one or both surfaces with a Lewis acid.

In addition, the invention provides for a process to produce improved asymmetric membranes in flat film or hollow fiber form having significantly improved gas separation properties, for example, comparable to or greater than the intrinsic selectivities of the polymer from which the asymmetric membrane is made and with acceptable permeation rates. It has been discovered that by treating asymmetric membranes with a Lewis acid, for example boron trifluoride, results in a modified asymmetric membrane having uncoated separation properties comparable to or higher than commercially available composite membrane separators. In addition, the invention has been found to have applications for composite separation membranes or multicomponent membranes where it is desired to eliminate surface porosity. For example, the selectivity of a multicomponent membrane can be improved by contacting one or both surfaces of the multicomponent membrane with a Lewis acid.

DESCRIPTION OF THE PREFERRED EMBODIMENTS

Attempts to eliminate surface defects of asymmetric gas separation membranes or even composite or multicomponent membranes have utilized spinning techniques relative to hollow fiber membranes and/or post-treatment techniques in order to improve asymmetric membrane performance. Generally, these treatment techniques have resulted in fibers that have economically poor gas fluxes or selectivities when in fact an improvement in both or at least a substantial improvement in one without seriously adversely affecting the other is desired. A significant increase in $\alpha$ achieved by contacting asymmetric membranes with Lewis acids even though accomplished with reductions in permeability is acceptable for many applications. Hollow fibers spun from relatively good permeation polymers have been modified in various ways but without achieving significant improvement in the fluxes or selectivities for gas separations. We have found that the treatment of asymmetric membranes in either flat film or hollow fiber form with a volatile Lewis acid offers improvement in the asymmetric membrane gas separation selectivities. The Lewis acid treatment provides a simple route to improving asymmetric gas separation membrane selectivity.

The material used for the asymmetric separation membrane may be a natural or synthetic substance having useful gas separation properties. In the case of polymers, both addition and condensation polymers which can be cast, extruded or otherwise fabricated to provide asymmetric separation membranes are included. The asymmetric separation membranes can be prepared, for example, by casting from a solution comprised of good solvent for the polymeric material into a poor or nonsolvent for the material. The spinning and/or casting conditions and/or treatments subsequent to the initial formation, and the like, can influence the morphology, i.e. the asymmetry and resistance to gas or fluid flow of the separation membranes.

Generally organic polymers, mixtures of organic polymers, or organic polymers mixed with inorganics are used to prepare the asymmetric separation membrane. Typical polymers suitable for the asymmetric separation membrane according to the invention can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(alkyl acrylates), poly(phenylene terephthalate), etc; polysulfides; polymers from monomers having alpha-olefinic unsaturation other than mentioned above such as poly(ethylene), poly(propylene), poly(butene-1), poly(4-methyl pentene-1), polyvinyls, e.g. poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly(benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

Selection of the asymmetric separation membrane for improved gas separations may be made on the basis of heat resistance, solvent resistance, mechanical strength of the asymmetric separation membrane, as well as other factors indicated by the operating conditions for selective permeation, as long as the asymmetric separation membrane has the prerequisite relative separation factors in accordance with the invention for at least one pair of gases.

In making asymmetric hollow filament separation membranes, a wide variety of spinning conditions may be employed. These methods are disclosed, for example, in the preparation of polysulfone hollow filaments by Cabasso et al in Research and Development of NS-1 and Related Polysulfone Hollow Fibers for Reverse Osmosis Desalination of Seawater, supra. In addition, methods taught for preparing the porous separation membrane as disclosed in U.S. Pat. No. 4,230,463 are appropriate for preparing the preformed asymmetric separation membranes which when contacted with effective amounts of a volatile Lewis acid result in the improved asymmetric gas separation membranes having enhanced separation factors.

One polymeric material utilized in gas separations is polysulfone. More recently polysulfone material has been combined as a porous or asymmetric hollow fiber with various coatings to provide suitable gas separation characteristics. Treatment of polysulfone hollow fibers with a Lewis acid results in membranes with uncoated selectivities comparable to or higher than those possible with untreated silicone coated asymmetric polysulfone membranes. Various Lewis acids will perform in differing ways depending upon the polymer material comprising the hollow fiber membrane; thus, varying concentrations and contact times from one acid-polymer system to another will be necessary in order to achieve the more pronounced improved selectivities according to the invention. In addition, the Lewis acid will be an acid which is generally volatile at ambient conditions since residual acid removal from the treated asymmetric membrane, for example by vaporization, is a preferred method for controlling and/or stopping the treatment. The acid treated membranes in flat film or hollow fiber form can be further aged or treated in, for example, nitrogen or similar sweep environments or by applying a vacuum to the fiber bore of the hollow fibers.

The acid treatment according to the invention can be carried out under a range of conditions with variations in concentrations, gas or liquid state, time, and temperature. Bundles of hollow fibers can be treated with a dilute or concentrated gaseous acid, aqueous acid, dilute acid solution or insitu produced acids. Acid exposure, for example, with boron trifluoride for treatment of asymmetric polysulfone hollow fibers can be as short as 20 seconds for a bundle of fibers and still be very effective. The acid contacted asymmetric membranes have lowered permeation rates, for example relative to hydrogen-methane separations; however, selectivity is significantly improved and potentially higher than the intrinsic selectivity of the polysulfone polymer. Since the acid treatment is not foreseen as producing chemical changes in the polymer, such acid treatment improvements in selectivity suggest permeation modification effects by the acid.

The improvement of uncoated asymmetric membrane separation properties for gas separation with a Lewis acid treatment is a general phenomenon which has application to hollow fiber or flat film systems other than polysulfone. For example, the treatment of polyphenylene oxide (PPO) fibers with boron trifluoride produces trends similar to those observed when polysulfone was treated with the same Lewis acid. Acid treated asymmetric gas separation membranes produced from the treatment of [copoly(styrene-acrylonitrile)](hereinafter SAN) hollow fibers with boron trifluoride resulted in an improvement in uncoated asymmetric hollow fiber selectivity. SAN is not a polyether like polysulfone or polyphenylene oxide previously discussed which indicates the broad application of the acid treatments. For example, an effective amount of acid treatment of any asymmetric gas separation membrane which is suitable in the selective permeation of gases is predicted to improve the selectivity properties of those membranes according to the invention. These observations justify the conclusion that the improvement of uncoated hollow fiber or flat film membrane selectivity as a result of acid treatment is applicable to many classes of polymeric membranes which have gas permeation capabilities.

The following examples are illustrative of the invention but are not intended as a limitation.

The acid treated asymmetric gas separation membranes were exposed to mixed gas streams and an elongated cylindrical chamber of about 150 cc capacity. Generally, the mixed feed gas pressure was in a range of 1.68 to 7.80 atmospheres. The feed gas enters one end of the elongated test module and exits from the other end with flow rates of from one through about six liters per minute. During the performance testing the bore side of the asymmetric hollow fiber membranes is vacuum pumped from 5 to 10 minutes until the system reaches equilibrium. Permeate gas is allowed to expand into a calibrated volume for the purposes of measuring rate as a result of pressuring per unit time. The permeate gas samples are then analyzed by Gas Chromatography methods.

The 6 examples illustrated in Table 1 provide asymmetric untreated polysulfone, SAN, and polyphenylene oxide, (examples 1, 3 and 5) which are then treated as indicated with boron trifluoride ($BF_3$) in accordance with the invention. Treatments include introduction of 100% $BF_3$ in gaseous form for 20 seconds followed by (a) a 2 minute nitrogen sweep, and (b) overnight bore vacuum while exposing the outside of the treated fibers to air. No attempts were made to optimize the treatments relative to concentration, pressure, exposure time and the like within the "effective amount" range.

TABLE 1

UNCOATED PERMEATION PROPERTIES OF LEWIS ACID MODIFIED ASYMMETRIC HOLLOW FIBERS WITH $BF_3$

| Example | Treatment | Days after treatment | $(P/l)$ $H_2 \times 10^6$ | $\alpha$ $H_2/CH_4$ |
|---|---|---|---|---|
| 1. Asymmetric Polysulfone Hollow Fiber | No | | 69 | 5.2 |
| 2. Same as Example 1 | 20 second exposure to 100% $BF_3$ followed by 2 minute $N_2$ sweep and overnight bore vacuum while fibers exposed to ambient air. | 2 | 37 | 70.0 |
| 3. Asymmetric SAN Hollow Fiber | No | | 43 | 3.4 |
| 4. Same as Example 3 | Same as Example 2 | 1 | 16 | 36.0 |
| 5. Asymmetric Polyphenylene Oxide Hollow Fiber | No | | 462 | 3.0 |
| 6. Same as Example 5 | Same as Example 2 | 1 | 170 | 29.0 |

The examples of Table 2 illustrate untreated polysulfone hollow fiber control (Example 7) which is treated as indicated and in accordance with the invention (Example 8). Examples 9 and 10 are not in accordance with the invention. The Lewis acids treatments with $SbCl_5$ and $TiCl_4$ were found to be outside the scope of the invention in that the aggressive treatment densified the asymmetric membrane surface and destroyed both the rate and separation factor for hydrogen and methane. No attempts were made to optimize the treatment with these two aggressive acids; however, optimization of concentration and exposure time would bring the two acid treatments under the "effective amount" conditions.

TABLE 2

UNCOATED PERMEATION PROPERTIES OF LEWIS ACID MODIFIED ASYMMETRIC POLYSULFONE HOLLOW FIBERS

| Example | Treatment | Days after treatment | $(P/l)$ $H_2 \times 10^6$ | $\alpha$ $H_2/CH_4$ |
|---|---|---|---|---|
| 7. Asymmetric Polysulfone Hollow Fiber | No | | 78 | 3.0 |
| 8. Same as Example 7 | 30 second $SnCl_4/N_2$ sweep followed by bore vacuum overnight with exposure to ambient air. | 1 | 24 | 36.0 |
| 9. Same as Example 7 | 30 second $SbCl_5/N_2$ sweep followed by bore vacuum overnight with exposure to ambient air. | TREATMENT CONDITIONS TOO AGGRESSIVE FOR RESULTS ACCORDING TO THE INVENTION | | |
| 10. Same as Example 7 | 30 second $TiCl_4/N_2$ sweep followed by bore vacuum overnight with exposure to ambient air. | TREATMENT CONDITIONS TOO AGGRESSIVE FOR RESULTS ACCORDING TO THE INVENTION | | |

We claim:

1. An asymmetric gas separation membrane exhibiting improved gas separation selectivity comprising, a preformed asymmetric separation membrane of material having selective permeation of at least one gas of a gaseous mixture over that of one or more remaining gases of the gaseous mixture which has been contacted on one or both surfaces with an effective amount of a Lewis acid, wherein with respect to the at least one gas, the acid contacted membrane exhibits a separation factor greater than the separation factor exhibited by the membrane before acid contact.

2. The improved asymmetric gas separation membrane of claim 1 wherein the separation factor for the one gas of the gas mixture is increased by at least 100%.

3. The improved asymmetric gas separation membrane of claim 1 wherein the material of the asymmetric membrane is comprised of a material selected from the group consisting of polymers and copolymers and substituted polymers of polyethers, polysulfones, polyaryleneoxides, polyethersulfones, cellulose esters, and copolymers of styrene and acrylonitrile.

4. The improved asymmetric gas separation membrane of claim 1 wherein the at least one gas is selected from the group consisting of carbon monoxide, nitrogen, oxygen, helium, methane, ethane, hydrogen, and carbon dioxide.

5. The improved asymmetric gas separation membrane according to claim 1 wherein the separation factor for the separation of hydrogen from a gaseous mixture comprised of hydrocarbons of 1 to about 5 carbon atoms is improved by at least about 200%.

6. A multicomponent gas separation membrane exhibiting improved gas separation selectivity and resistance to hydrocarbons degradation, comprising, an asymmetric membrane coated with one or more materials, said membrane having selective permeation of at least one of a gaseous mixture over that of one or more remaining gases of the gaseous mixture which has been contacted on one or both surfaces with an effective amount of a Lewis acid, wherein with respect to the at least one gas, the acid contacted multicomponent gas separation membrane exhibits an improved separation factor greater than the separation factor exhibited by the multicomponent gas separation membrane before acid treatment.

* * * * *